(12) United States Patent
Lauer

(10) Patent No.: US 9,147,065 B2
(45) Date of Patent: Sep. 29, 2015

(54) DETERMINING HUMAN STIMULI AT COMPUTING DEVICES

(71) Applicant: GOGO LLC, Chicago, IL (US)

(72) Inventor: Bryan A. Lauer, Hinckley, IL (US)

(73) Assignee: GOGO LLC, Chicago, IL (US)

( * ) Notice: Subject to any disclaimer, the term of this patent is extended or adjusted under 35 U.S.C. 154(b) by 57 days.

(21) Appl. No.: 13/781,841

(22) Filed: Mar. 1, 2013

(65) Prior Publication Data
US 2014/0250502 A1 Sep. 4, 2014

(51) Int. Cl.
G06F 21/36 (2013.01)
G06F 21/31 (2013.01)
G06K 9/00 (2006.01)
G06F 21/00 (2013.01)

(52) U.S. Cl.
CPC .............. G06F 21/36 (2013.01); G06F 21/316 (2013.01); G06F 21/00 (2013.01); G06F 2221/2133 (2013.01); G06K 9/00 (2013.01)

(58) Field of Classification Search
CPC ........... G06K 9/00; G06F 21/00; G06F 21/20; G06F 21/31; G06F 21/36
USPC ......................................................... 726/5, 3
See application file for complete search history.

(56) References Cited

U.S. PATENT DOCUMENTS

| | | |
|---|---|---|
| 8,122,384 B2 | 2/2012 | Partridge et al. |
| 8,217,800 B2 | 7/2012 | Vander Veen et al. |
| 2010/0229223 A1 | 9/2010 | Shepard et al. |
| 2011/0150267 A1* | 6/2011 | Snelling et al. ............... 382/100 |
| 2012/0254940 A1* | 10/2012 | Raper ................................ 726/3 |
| 2012/0265372 A1* | 10/2012 | Hedrick ............................ 701/3 |

FOREIGN PATENT DOCUMENTS

| | | |
|---|---|---|
| CN | 2919774 Y | 7/2007 |
| EP | 2339497 A2 | 6/2011 |

OTHER PUBLICATIONS

"Elevator", Wikipedia, 2013, http://en.wikipedia.org/w/index.php?title—Elevator&oldid=540929841, 31 pages.
Conti et al., Mind how you answer me!, Information, Computer and Communications Security, 249-259(2011).
International Search Report and Written Opinion in corresponding PCT/US2014/013975, mailed May 9, 2014.
(Continued)

*Primary Examiner* — Brandon Hoffman
*Assistant Examiner* — Samuel Ambaye
(74) *Attorney, Agent, or Firm* — Marshall, Gerstein & Borun LLP; Randall G. Rueth

(57) ABSTRACT

Techniques for granting access to an application or service based on a detected human stimulus at a computing device include detecting a stimulus that is generated by an external entity and independent of a CAPTCHA or CAPTCHA-like challenge. If the stimulus is included in a set of human stimuli, access to the application or service may be granted. Otherwise, access may be denied. The detected stimulus may be ad-hoc, or may be a response to an explicit challenge other than a CAPTCHA or CAPTCHA-like challenge. A background application may continuously test over time for ad-hoc stimuli that are consistent with a human presence, and may maintain or deny access accordingly. The detected stimulus may include changes in states of components of the computing device that are related to spatial orientation and/or location. Access to the application or service may be granted/denied based on the detected stimulus and an additional criteria.

20 Claims, 3 Drawing Sheets

(56) References Cited

OTHER PUBLICATIONS

Platzer, C., Sequence-based bot detection in massive multiplayer online games, Information, Communications and Signal Processing (ICICS), 1-5(2011).

Thorpe et al., Pass-thoughts: authenticating with our minds, International Association for Cryptologic Research, vol. 20050421:233346, 1-14(2005).

* cited by examiner

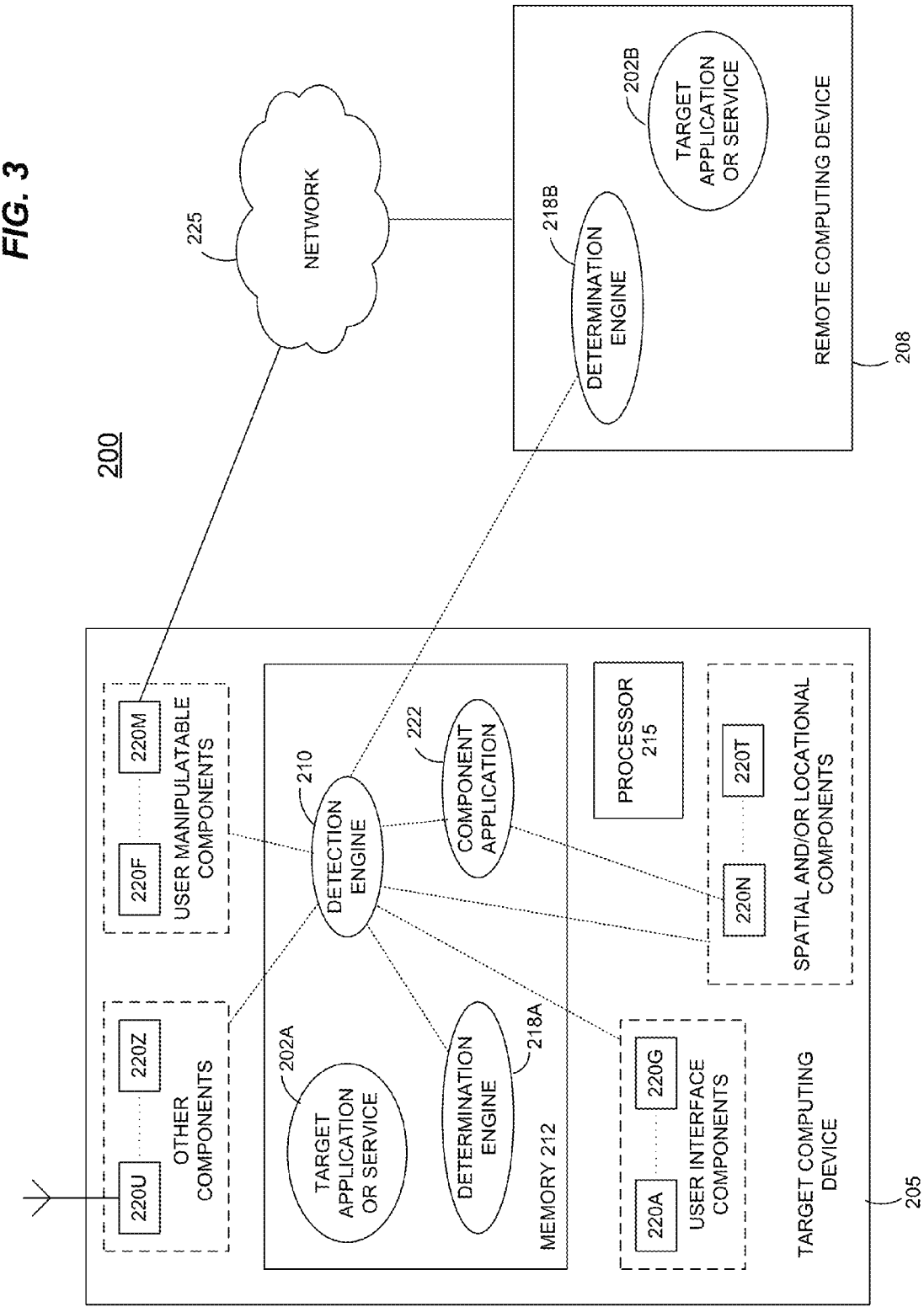

DETERMINING HUMAN STIMULI AT COMPUTING DEVICES

FIELD AND BACKGROUND OF THE DISCLOSURE

1. Technical Field

The instant disclosure generally relates to computing devices. More particularly, the instant disclosure generally relates determining whether or not a stimulus detected at a computing device is consistent with stimuli that are generated by humans.

2. Background

Currently known techniques to determine whether or not a person or a computer is interacting with a computing device typically use a visual challenge-response test. These visual challenge-response tests are generally easy for a computer to generate and easy for a human to solve, but are difficult for computers to solve. One such commonly used test is a CAPTCHA (Completely Automated Public Turing test to tell Computers and Humans Apart), which typically is a series of alphanumeric symbols or other symbols that are commonly found on a keyboard, key pad or equivalent user interface of a computing device. The symbols are distorted, warped, or otherwise disfigured when presented, but remain generally legible to humans. In a typical visual challenge-response test, a computing device generates a CAPTCHA phrase and presents the CAPTCHA phrase on a display. A person or human views the distorted image and enters the displayed symbols via the keyboard, key pad, or equivalent. If a mostly correct series of symbols is received by the computing device, the computing device presumes that the symbols were entered by a human. CAPTCHAs are typically used in situations where automated software access may be detrimental to a system or otherwise undesired, such as e-mail spam, automated postings, financial or other secured transactions, authorized access, and the like. Examples of prior art CAPTCHA displays are illustrated in FIGS. 1A and 1B. FIG. 1A shows two series of warped alphabetic characters that are each overlaid with an angled line, and FIG. 1B shows three series of warped alphanumeric characters in which the symbols are crowded together.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of granting access to an application or service based on a detected human stimulus may include detecting an externally generated stimulus at a computing device. The externally generated stimulus may be generated or originated by an entity other than the computing device. Additionally, the externally generated stimulus may be independent of a response to a challenge of an ordered series of symbols that have been previously presented at a user interface of the computing device prior to the detection of the externally generated stimulus, where a response to the challenge may be an attempt by an entity external to the computing device to enter the previously presented ordered series of symbols at the computing device. The method may further include determining if the externally generated stimulus is included in a set of human stimuli, where the set of human stimuli includes at least one of: externally generated stimuli that are able to be generated by a human, or externally generated stimuli that are consistent with stimuli that are able to be generated by the human. The method may cause access to an application or service to be granted or denied based on the determination of whether or not the externally generated stimulus is included in the set of human stimuli.

A system for granting access to an application or service based on a detected human stimulus may include a detection engine and a determination engine. The detection engine and the determination engine each may include respective machine readable instructions that are stored on one or more non-transitory computer readable storage medium or media. When executed by a processor, the machine readable instructions may cause the system to receive an indication of a detection of an externally generated stimulus at a computing device, such as a mobile device. The externally generated stimulus may be independent of a response to a challenge, where the challenge includes an ordered series of symbols presented at a user interface of the mobile device prior to the detection of the externally generated stimulus, and a response to the challenge includes an attempt by an entity external to the mobile device to enter the presented ordered series of symbols at the computing device. The machine readable instructions, when executed, may further cause the system to determine whether or not the externally generated stimulus is included in a set of human stimuli, where the set of human stimuli includes at least one of: externally generated stimuli that are able to be generated by a human, or externally generated stimuli that are consistent with stimuli that are able to be generated by the human. Additionally, the machine readable instructions, when executed, may cause the system to cause access to an application or service to be granted when the externally generated stimulus is determined to be included in the set of human stimuli, and may cause the system to cause access to the application or service to be denied when the externally generated stimulus is determined to be not included in the set of human stimuli.

BRIEF DESCRIPTION OF SEVERAL VIEWS OF THE DRAWINGS

FIG. 3 illustrates a block diagram of a example system 200 for granting access to an application or service 202 based on a detected human stimulus.

DETAILED DESCRIPTION OF THE PREFERRED EMBODIMENTS

Figure 1:
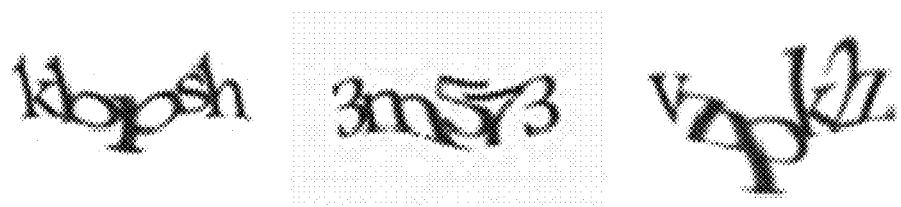
FIGS. 1A and 1B show examples of prior art CAPTCHAs used to determine whether a human or a computing device is interacting with a computing device.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Determining human stimuli at computing devices helps to assure that a human being or person, and not another computing device or an automated program, is attempting to access a particular service or application. If a human being or person is determined to be interacting with the computing device, access to the service or application may be granted. Such access assurances typically are required for purchases, security reasons, or other applications or services. Typically, when a party tries to access a service or application, a challenge test that is difficult for automated software to act upon and that requires a person to enter data to pass the challenge test is issued. One commonly used challenge is a CAPTCHA (Completely Automated Public Turing test to tell Computers and Humans Apart), which typically consists of a series of alphanumeric symbols (or other symbols that are commonly found on a keyboard, keypad, touch screen or equivalent user interface) that are distorted, warped, or otherwise disfigured, but remain generally legible to humans. A person views the distorted image and enters the corresponding symbols of the distorted image. If a sufficiently matching series of symbols is received by the computing device, the service or application presumes that the symbols were entered by a human and allows access to the service or application. This visual challenge approach, however, requires that image be simple enough for people to decode, yet complex enough so that software is unable to decode the image.

The novel techniques, systems and methods disclosed herein leverage components, functionality, and/or user interfaces of a computing device to determine whether or not a human is interacting with the computing device. Access to one or more services and/or applications may be granted if a stimulus is detected and determined to be consistent with human-generated stimuli. The novel techniques may provide an explicit challenge to a user, or the techniques may be utilized without an explicit challenge. In some embodiments, the computing device may be a mobile device such as a smart device, a phone, a tablet computing device, an electronic reading device, a laptop computer, or other portable, mobile device having a memory, a processor and a wireless interface. In some embodiments, the computing device may be a stationary computing device such as a desktop computing device, a server, or other computing device that generally is not ported to different locations. The techniques, systems and methods are described herein with reference to mobile computing devices, however, the techniques, systems and methods are equally applicable to computing devices that remain essentially stationary.

Figure 2:
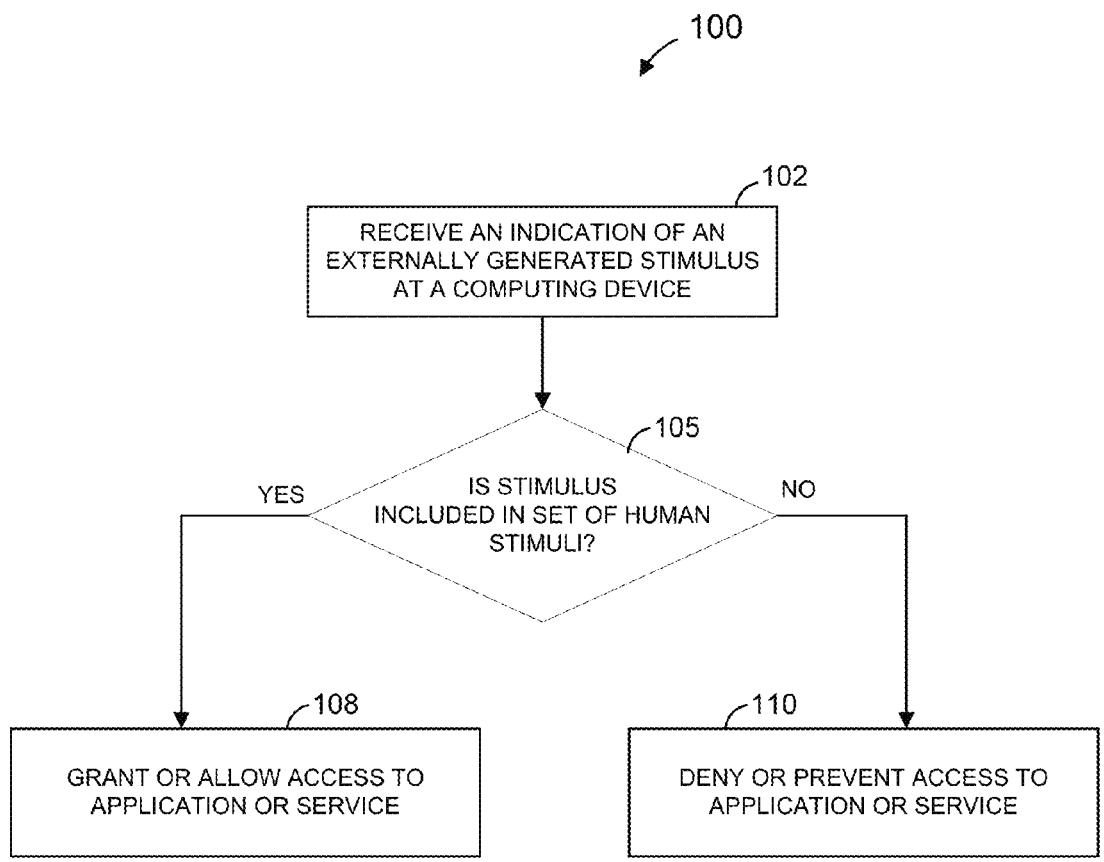
FIG. 2 is an example method of granting access to an application or service based on a detected human stimulus.

FIG. 2 is an example method 100 of granting access to an application or service based on a detected human stimulus. The access may be granted to a party that attempts to access the application or service via a computing device, referred to herein as a "target computing device." The method 100 may be performed locally at the target computing device, or the method 100 may be performed by a computing device that is remote to the target computing device (a server, peer device, or other computing device) in communication with the target computing device. In some embodiments, the target computing device may perform at least a portion of the method 100, and the remote computing device with which the target computing device is in communication may perform at least a portion of the method 100.

Turning to block 102, the method 100 may include receiving an indication that an externally generated stimulus has been detected at the target computing device. A stimulus detected at the target computing device may be an action or activity whose object of action or activity is at least some part or component of the target computing device, or whose result affects at least some part or component of the target computing device. As such, an "externally generated" stimulus may be a stimulus that is neither generated nor originated by any part or component of the target computing device, and instead is generated or originated by a separate entity other than the target computing device.

The detected, externally generated stimulus (block 102) is independent of an attempt to reproduce or enter an ordered series of symbols that was previously presented on a user interface of the computing device prior to the detection of the externally generated stimulus. For example, the detected, externally generated stimulus (block 102) is not a response to a CAPTCHA or CAPTCHA-like challenge, and the detected, externally generated stimulus is not an attempt to recreate, reproduce or enter an ordered series of ASCII-printable characters that has been previously presented on the user interface.

Rather, the detected, externally generated stimulus (block 102) may be another type of externally generated stimulus that is detected by one or more components of the target computing device. In an embodiment, the externally generated stimulus may be a response to a challenge other than a CAPTCHA or CAPTCHA-like challenge. Alternatively or additionally, the externally generated stimulus may be an ad-hoc stimulus that is generated or originated independently of any challenge, e.g., is not a response to a previously issued challenge.

Referring to block 105, the method 100 includes determining if the detected externally generated stimulus is included in a set of stimuli that are able to be generated by a human or that are consistent with stimuli that are able to be generated by a human being, e.g., whether the detected externally generated stimulus passes a Turing or Turing-like test. For brevity, the set of stimuli that are able to be generated by a human or that are consistent with stimuli that are able to be generated by a human is referred to herein as the "set of human stimuli." As previously discussed, the detected, externally generated stimulus excludes a response to a CAPTCHA or CAPTCHA-like challenge, and excludes a response that is an attempt to enter or reproduce an ordered series of ASCII-printable characters that has been previously presented on the user interface.

The detected, externally generated stimulus, though, may be a response to another type of challenge. One example of such a challenge may be a visual challenge, such as an image that is presented at a display or touch screen of the computing device which requires a user response. Only certain responses to the displayed image are considered valid or suitable responses, e.g., are included in the set of human stimuli. For example, the image may be a maze or a map through which a person navigates a path using a touch screen input. In another example, a human being or user may be required to draw a figure or to touch a displayed pattern of dots, dashes, lines and/or shapes on the touch screen. In another example, the image may be a scene with which a user must interact, e.g., "How many trees are to the right of the boy in the blue hat?" or "Drag the ball to the basket." Other examples of visual, non-CAPTCHA-like challenges may also be possible. In an embodiment, the visual challenge may be randomly or pseudo-randomly generated.

In an embodiment, more than one response to the visual challenge may be considered to be suitable, that is, each response of a range of responses to the visual challenge may be indicative that a human has entered the response. For instance, in response to the above maze or map example, although a human may draw a path that does not successfully traverse the maze, the nature of the drawn path may be indicative of a human-generated response and not a computer-generated response, and thus may be considered a response included in the set of human stimuli.

In some embodiments, rather than a visual challenge, the challenge may be an audio challenge. For example, an audio challenge may be presented by a speaker, a headset interface, or other audio output device of the target computing device, and a suitable response (e.g., that is included in the set of human stimuli) may be a human voice detected at a microphone that contains expected words or phrases. Similar to the visual challenge, in an embodiment, a range of responses to the audio challenge may be considered suitable responses.

In some embodiments, the visual or audio challenge may be contextual, e.g., contextual to the application, contextual to the user, contextual to the environment in which the application may be used, contextual to a function of the application, or contextual to some other suitable criteria. In an illustrative but non-limiting scenario, consider an application or service that provides local area network wireless connectivity within the cabin of a vehicle while the vehicle is in transit or en route from an origination to a destination. This application or service may be provided, for example, by a publisher node in a vehicle data distribution system, such as described in co-pending U.S. patent application Ser. No. 13/675,194 entitled "PUBLISHER AND SUBSCRIBER MESSAGING SYSTEM AND METHOD" and filed Nov. 13, 2012, the contents of which are hereby incorporated by reference in their entirety, and in co-pending U.S. patent application Ser. No. 13/675,200 entitled "VEHICLE DATA DISTRIBUTION SYSTEM AND METHOD" and filed Nov. 13, 2012, the contents of which are also hereby incorporated by reference in their entirety.

In this example scenario, a local wireless connectivity service within the cabin of the vehicle may be provided by a publishing node. The publishing node may be a computing device that is fixedly connected to the vehicle so that the computing device is transported by the vehicle as the vehicle moves. The service published by the node may be, for example, a service that provides connectivity to a public local area wireless network for devices of passengers who are on board the vehicle, or the service may be a service that provides connectivity to a private local area wireless network for use by airline, federal safety, and/or law enforcement personnel. It would be undesirable for unauthorized devices to automatically connect to such networks, at least for the reason that network bandwidth for legitimate users would be reduced. Still worse, it would be dangerous for an unattended, unauthorized device to be able to connect to such in-vehicle networks to perform a nefarious, illegal or disastrous activity such as disabling aircraft electronics or detonating an explosive device. In these and other scenarios, it is imperative that the access to the in-vehicle wireless network be granted only after a stimulus that is consistent with a human generated stimulus is detected.

An example challenge that is contextual to the in-vehicle wireless connectivity application may be a question or an instruction that is presented on a user interface of the target computing device. The target computing device may be, for example, a mobile device of a passenger on-board the vehicle, or a device of an airline, federal safety, and/or law enforcement personnel, and the user interface may be, for example, a visual display, an audio interface, or some other user interface. The question or instruction may be contextual to the environment of the application, e.g., "What is your flight number?" or "Enter the airport from which this flight has departed." If the entered response corresponds to known environmental context (e.g., to known flight information), then access to the application is granted, in an embodiment. In some embodiments, in addition to a sufficiently correct response to the challenge, one or more additional criteria may be required to be met before access to the application is granted. For example, both a sufficiently correct response and an en route flight status or an aircraft altitude over 10,000 feet may be required in order for access to the application to be granted.

In some embodiments, the question or instruction may be contextual to the application itself. For example, a name of an in-flight wireless network may be randomly changed for each flight and be made available to the passengers only after the aircraft is aloft. An example of a question or instruction challenge that is contextual to the application may thus be "What is the current provided name of the in-flight wireless network to which you are trying to connect?" In some embodiments, the question or instruction challenge may be contextual to the user, such as "What is your assigned seat number?" or "Enter your flight record locator number." In some embodiments, multiple contextual questions or instructions may be required to be answered correctly in order to be granted access.

Other types of challenges may require a user to interact with the target computing device in a manner other than by using a key board, key pad or touch screen to enter displayed characters. For example, a mobile computing device may include an accelerometer and/or a compass function, and a challenge may require the user to change the spatial orientation of the target computing device in order to pass the challenge. In some embodiments, the challenge may ask the user to shake the target computing device, align the target computing device to true north, tilt the target computing device to have an image of a ball roll from one side of the display to a target on the other side of the display, or tilt the target computing device to have an image of a plane land on a runway. In another example, a challenge may require the user to directly manipulate a user interface in order to pass the challenge. For example, the target computing device may instruct the user to turn the silent mode on and off, to adjust the volume control up and down, to tap four corners of the touch screen, or speak a randomly-generated phrase or answer a randomly-generated question presented on the display screen of the target computing device. Of course, other challenges requiring a user to interact with the target computing device other than by using a key board, key pad or touch screen to enter displayed characters may be possible.

Having discussed examples of non-CAPTCHA and non-CAPTCHA-like challenges and corresponding responses that may be included in the set of human stimuli, a discussion of ad-hoc stimuli (e.g., stimuli that are generated in an ad-hoc manner and not in response to an explicit challenge) that may be included in the set of human stimuli follows. Generally, such ad-hoc stimuli are stimuli that may be able to be detected by one or more components of the target computing device and that may be indicative of the presence of a person.

In an embodiment, the one or more components at which an ad-hoc stimulus may be detected may be components of the target computing device that are able to be directly manipulated by a human being. In a mobile computing device, for example, such components may include a keyboard; a key pad; a touch screen; a mouse; a tracking pad; a tracking ball; a plug-in connection for an SD (Secure Digital) card, a USB (Universal Serial Bus) device, an Ethernet or other network interface, a power cord, or other physical connector; a dial; a volume control; a screen brightness control; a silent mode control; a power on/off button; an eject button of a drive; a camera; a microphone; or any other component of the computing device that is able to be physically manipulated by a human being. The target computing device may infer that a human being is interacting with the target computing device when a change in state or a manipulation of any of these manipulatable components is detected. For example, a connection of an external device into a port of the target computing device, a swipe on a tracking pad or touch screen, a volume adjustment, and other such changes of state of a manipulatable component may indicate that a human being is interacting with the target computing device. As such, a change in state or a manipulation of one or more components of the target computing device that are able to be manipulated by a human may be included in the set of human stimuli.

In an embodiment, the one or more components at which an ad-hoc stimulus may be detected may not be physically manipulatable by a human being, but may otherwise detect the presence of a human being. For example, a biosensor may sense, measure or detect a fingerprint, an eye scan, a temperature of a touch that is consistent with human body temperature, or some other biological parameter that may be indicative of a human being interacting with the target computing device. Thus, a positive detection at a biosensor may be included in the set of human stimuli.

In an embodiment, the one or more components at which an ad-hoc stimulus may be detected may be components of the target computing device that are not directly manipulated or contacted by a human being, but nonetheless may be indicative of a human being using the target computing device when a change in state occurs. Such components may include, for example, components that measure, detect, sense or pertain to a spatial orientation or location of the computing device. For example, a mobile computing device may include an accelerometer and/or a compass function. If the accelerometer and/or the compass function detects a change in the spatial orientation of the target computing device, the target computing device may infer that a human being caused the spatial orientation change and thus is interacting with the target computing device. Accordingly, a change in the spatial orientation of the target computing device may be included in the set of human stimuli.

The method 100 may include causing access to an application or service to be granted based on the determination that the externally generated stimulus is included in the set of human stimuli. In particular, if the detected stimulus is determined be included in the set of human stimuli (block 105), the method 100 may cause access to the application or service to be granted (block 108). For example, the method 100 may grant the access to the application or service, or the method 100 may indicate to the application or service (or to another application or service) that access may be granted. If the detected stimulus is determined to be excluded from the set of human stimuli, the method 100 may deny or prevent access to the application or service (block 110). For example, the method 100 may deny or prevent the access to the application or service, or the method 100 may indicate to the application or service (or to another application or service) that access may be denied or prevented.

In an embodiment, one or more of the members of the set of human stimuli (including the members discussed above and other members) may be weighted or scored with a respective value. Each respective value may be indicative of how strongly (or how weakly) its corresponding member is indicative of a human being actually interacting with the computing device. For example, a compass change may be considered more indicative of a user's actual presence at the target computing device than is a voice detected at a microphone, as the detected voice may be environmental and not as strongly indicative of a direct user of the target computing device. Accordingly, a detected compass change may be assigned a higher or stronger weight than is assigned to a detection of a voice. In an embodiment, values of one or more detected ad-hoc stimuli may be aggregated or totaled. When the aggregated value exceeds a threshold, then the target computing device may infer that a human being is interacting with the target computing device (block 105) and access may be granted to the application (block 108).

In an embodiment, the target computing device may monitor the occurrences and/or types of detected ad-hoc stimuli over time. For example, the target computing device may set a timer, and as long as at least one subsequent ad-hoc stimulus is detected before the timer expires, the target computing device may infer that a human being is still interacting with the target computing device (block 105). As such, the target computing device may maintain continued access to one or more particular applications (block 108) and reset the timer. If the timer expires without detection of another ad-hoc stimulus, however, access to the one or more applications may be terminated, denied or temporarily paused (block 110). After the termination or denial of access (block 110), another ad-hoc stimuli and/or a response to an explicit challenge may be required to be detected before access is resumed, in an embodiment.

In some embodiments, a combination of timing and weighting of ad-hoc stimuli may be considered when determining whether or not access is to be granted or denied. The timers, weightings of stimuli and/or thresholds may be modifiable.

In some embodiments, access to the application may be granted (block 108) only when more than one stimulus is detected, and in some cases, within a particular time period. The multiple stimuli may include an ad-hoc stimuli and a response to an explicit challenge, the multiple stimuli may include multiple ad-hoc stimuli, or the multiple stimuli may include multiple responses to multiple explicit challenges.

In some embodiments, access to more than one application may be granted (block 108) when a stimulus included in the set of human stimuli is detected (block 102). In some embodiments, in addition to a stimulus being determined to be included in the set of human stimuli (block 105), an additional level of authorization such as a login/password or a biometric identification may be required before access to the application is granted (block 108).

The techniques, systems and methods described herein provide numerous advantages over known CAPTCHA and CAPTCHA-like techniques to test for human presence. For example, the techniques described herein do not compete with ever-advancing advances in string or character parsing. Additionally, at least some of the techniques described herein are able to be safely used in situations in which reading and entering a series of characters is inadvisable, e.g., a user may merely shake or re-orient the computing device. Furthermore, the techniques described herein provide convenience to users. For instance, as a background application may continuously check over time for re-occurring ad-hoc human stimuli, a user no longer needs be constantly interrupted to provide various responses in order to receive or maintain access to one or more applications and/or services.

FIG. 3 is an example of a block diagram of a system 200 for granting access to an application or service 202 (also referred to herein as a "target application or service" to distinguish from references herein to other applications and/or services) based on a detected human stimulus. The system 200 may operate in conjunction with a target computing device 205 to which the access to the application or service is granted or denied. In an embodiment, the application or service 202 may be stored and executed locally at the target computing device 205 (e.g., as denoted by reference 202A). In an embodiment, the application or service 202 may be stored at and provided by a remote computing device 208 (e.g., as denoted by reference 202B). In some embodiments, the application or service 202 may be provided at least in part both by the target computing device 205 (e.g., reference 202A) and by the remote computing device 208 (e.g., reference 202B), such as by using a client/server, publisher/subscriber, peer-to-peer, or other suitable arrangement. The system 200 may execute one or more portions of the method 100 of FIG. 2, in an embodiment, or the system 200 may execute all of the method 100, in an embodiment.

The system 200 may include a detection engine 210 at the target computing device 205. In an embodiment, the detection engine 210 may comprise a set of computer-executable instructions that are stored on a tangible, non-transitory computer-readable storage medium of the target computing device 205, such as a memory 212. The computer-executable instructions may be executable by a processor 215 of the target computing device 205 to receive indications of detected stimuli and to provide information about the detected stimuli to a determination engine 218 for analysis.

In an embodiment, the determination engine 218 may comprise a set of computer-executable instructions (e.g., reference 218A) that are stored on a tangible, non-transitory computer-readable storage medium of the target computing device 205, such as the memory 212 or another local memory. The computer-executable instructions 218A may be executable by the processor 215 of the target computing device 205 to determine whether or not a detected stimulus is included in the set of human stimuli. In another embodiment, the determination engine 218 may comprise computer-executable instructions (e.g., reference 218B) that are stored on and executed by the remote computing device 208.

In an embodiment, the system 200 may include the target application or service 202A but not the target application or service 202B, or the system 200 may include the target application or service 202B but not the target application or service 202A. In an embodiment, the target application or service 202 may reside at least in part at both the target computing device 205 (e.g., reference 202A) and at the remote computing device 208 (e.g., reference 202B), such as by using a client/server, publisher/subscriber, peer-to-peer, or other suitable arrangement. The target application or service 202A may be downloaded to the target computing device 205, for example. Accordingly, as used herein, the phrase "target application or service 202" may apply to embodiments that include the target application or service 202A, the target application or service 202B, or both the target application or service 202A and 202B. In an embodiment, the target application of service 202 is not included in the system 200 but is in communicative connection with the system 200, such as by way of the determination engine 218.

With regard to the determination engine 218, in an embodiment the system 200 may include the determination engine 218A but not the determination engine 218B, or the system 200 may include the determination engine 218B but not the determination engine 218A. In another embodiment, the determination engine 218 may reside at least in part both at the target computing device 205 (e.g., reference 218A) and at the remote computing device 208 (e.g., reference 218B), such as by using a client/server, publisher/subscriber, peer-to-peer, or other suitable arrangement. The determination engine 218A may be downloaded to the target computing device 205, for example. Accordingly, as used herein, the phrase "determination engine 218" may apply to embodiments that include the determination engine 218A, the determination engine 218B, or both the determination engine 218A and 218B.

In an embodiment of the system 200, a single determination engine 218 may provide security for more than one application or service, such as for the application or service 202 and for at least one other application or service (not shown) that is stored at or provided by the target computing device 205, the remote computing device 208, or jointly by the target computing device 205 and the remote computing device 208.

As previously mentioned, the detection engine 210 may be configured to receive indications of detected stimuli from one or more components of the target computing device 205 and to provide information about the detected stimuli to the determination engine 218 for analysis. As such, the detection engine 210 may be in communicative connection with one or more components or devices (generally referred to herein by the reference 220) that are included in target computing device 205.

The components or devices 220 included in the target computing device 205 with which the detection engine 210 may be in communicative connection may include one or more user interfaces 220A-220G via which a person may provide input to the target computing device 204. Examples of user interfaces 220A-220G may include a keyboard, a key pad, a mouse, a touch pad, a touch screen, a microphone, a tracking pad, a tracking ball, and/or other user interfaces. Additionally or alternatively, the components 220 of the target computing device 205 with which the detection engine 210 may be in communicative connection may include one or more user manipulatable components 220B-220N, which typically (but not necessarily) may be one or more mechanical components that are accessible from the exterior of the computing device 205 and via which a user may manipulate to operate or change an aspect of the target computing device 205. Examples of user manipulatable components may include a power on/off switch; a control or switch to mute or silence the target computing device 205; one or more ports to receive a data storage device such as a memory card, a disc, a portable memory storage device and the like; one or more interfaces for one or more wired network connections 220M; a port to receive a power cord connector, and other user manipulatable components.

In an embodiment, the detection engine 210 may be in communicative connection with one or more components 220N-220T of the target computing device 205 that provide indications of the spatial orientation and/or location of the target computing device 205. For example, the detection engine 210 may be in communicative connection with an accelerometer, a compass 220N, a GPS (Global Positioning System) receiver, an altimeter, or other spatial orientation and/or location related component.

In some embodiments, the detection engine 210 may be in communicative connection with at least one component 220 of the computing device 205 via a corresponding component application 222 stored on the computing device 205. For example, the detection engine 210 may be in communicative connection with the compass 220N via an application 222 (such as a compass application) that is stored in the memory 212 or in another local memory and is executed by the processor 215 of the target computing device 205.

Generally, the detection engine 210 may be in communicative connection with any component 220 of the target computing device 205 at which an externally generated stimulus may be detected or inferred, and in some cases by communicating with a respective component application 222 of the particular component 220.

The target computing device 205 may include one or more other components 220U-220Z, with each of which the detection engine 210 may or may not be in communicative connection. For example, the target computing device may include a wireless interface 220U to connect to a wireless network, a bus, various memories or storage devices such as Random Access Memories (RAM) and Read Only Memories (ROM), and other components.

After receiving an indication of a detection of an externally generated stimulus from one of the components 220 of the target computing device 205, the detection engine 210 may provide an indication or information about the externally generated stimulus to the determination engine 218. For example, the detection engine 210 may indicate the particular component at which the stimulus was detected, the nature or content of the stimulus, a time stamp, and/or other information pertaining to the detected stimulus. The determination engine 218 may determine whether or not the detected, externally generated stimulus is included in the set of stimuli that are able to be generated by a human or that are consistent with stimuli that are able to be generated by a human, such as previously discussed with respect to FIG. 2. Based on whether or not the detected, externally generated stimulus is included in the set of human stimuli, the determination engine 218 may inform the application or service 202 as to whether or not access to the application or service 202 has been granted. If access has been granted, then the target computing device 205 (or user thereof) may access the application or service 202. If access is denied, then access to the application or service 202 is prevented. In some embodiments, a indication of the granted or denied access is also presented on a user interface 220A-220G.

Although FIG. 3 illustrates one embodiment of the system 200, other embodiments may be possible. For example, the local target application or service 202A and the determination engine 218A may be aggregated into a single, unitary application at the target computing device 205. In another example, only the detection engine 210 may reside at the target computing device 205, while the remote target application or service 202B and the determination engine 218B may both entirely reside at the computing device 208 (e.g., either as an aggregated, unitary application or as two distinct applications 202B and 218B). For instance, the detection engine 210 may be a client of the aggregated application or service 202B/determination engine 218B. In an embodiment, the detection engine 210 may be downloaded from the computing device 208 or from another computing device to the target computing device 205.

In some embodiments, the remote computing device 208 may include more than one computing device. For example, the remote computing device 208 may be a multiplicity of interconnected servers or a computing cloud. In such embodiments, the application or service 202B and the determination 218B may be at least partially stored on different computing devices 208.

Furthermore, the target computing device 205 and the computing device 208 may be in direct or remote communicative connection, e.g., via a wired network interface 220U and/or via a wireless network interface 220M of the target computing device 205 and zero or more intermediate networks 225. The zero or more intermediate networks 225 may include a public network, a private network, or a combination of one or more public and private networks, in an embodiment. The zero or more intermediate networks 225 may include a wired network, a wireless network, or both wired and wireless networks, in an embodiment.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of granting access to an application or service based on a detected human stimulus, comprising:
   detecting, at a computing device of a user on-board an aircraft, an externally generated stimulus, the externally generated stimulus being a response to a contextual challenge issued at a user interface of the computing device, a content of the contextual challenge being contextual to the aircraft and suitable to determine if the externally generated stimulus is applied by a human and not by another computing device;
   determining, at the computing device, if the externally generated stimulus is included in a set of suitable responses to the contextual challenge; and
   causing, by the computing device, access to an application or service to be granted based on the determination that the externally generated stimulus is included in the set of suitable responses to the contextual challenge.

2. The method of claim 1, wherein the computing device is a mobile computing device.

3. The method of claim 1, wherein:
   the contextual challenge is a first challenge; and
   causing access to the application or service to be granted based on the determination that the externally generated stimulus is included in the set of suitable responses to the contextual challenge comprises causing access to the application or service to be granted based on (i) the determination that the externally generated stimulus is included in the set of suitable responses to the contextual challenge, and (ii) a reception of a suitable response to a second challenge.

4. The method of claim 3, wherein one of:
the second challenge is an explicit challenge issued by the computing device; or
the second challenge is not an explicit challenge issued by the computing device and the suitable response to the second challenge is an ad-hoc stimulus.

5. The method of claim 3, wherein the second challenge is a second contextual challenge issued by the computing device.

6. The method of claim 1, wherein causing the access to the application or service to be granted comprises causing access to be granted to a first application or service that is in communicative connection with a second application or service stored on a second computing device, the second computing device being fixedly connected to a vehicle.

7. A system for granting access to an application or service based on a detected human stimulus, comprising:
a non-transitory computer readable storage medium or media;
machine readable instructions stored on the non-transitory computer readable storage medium or media that, when executed by a processor, cause the system to:
receive an indication of a detection of an externally generated stimulus at a mobile device operated by a user on-board an aircraft, the externally generated stimulus being a response to a contextual challenge issued at the mobile device, a content of the contextual challenge being contextual to the aircraft and suitable to determine if the externally generated stimulus is applied by a human and not by another computing device;
determine whether or not the externally generated stimulus is included in a set of suitable responses to the contextual challenge;
cause access to an application or service to be granted when the externally generated stimulus is determined to be included in the set of suitable responses to the contextual challenge; and
cause access to the application or service to be denied when the externally generated stimulus is determined to be not included in the set of suitable responses to the contextual challenge.

8. The system of claim 7, wherein the mobile device is a first computing device, and wherein at least one of: at least a portion of the non-transitory computer readable storage medium or media is included in the mobile device, or at least a portion of the non-transitory computer readable storage medium or media is included in a second computing device in communicative connection with the mobile device.

9. The system of claim 7, wherein the non-transitory computer readable storage medium or media is included in the mobile device, and wherein at least a portion of the machine readable instructions are downloaded to the mobile device.

10. The system of claim 7, wherein the mobile device is a first computing device, and wherein at least a portion of the non-transitory computer readable storage medium or media is included in a second computing device in communicative connection with the mobile device, and at least a subset of the portion of the machine readable instructions are executed as at least a part of the application or service.

11. The system of claim 7, wherein the mobile device is a first computing device, and wherein the application or service stored on the mobile device is a first application or service in communicative connection with a second application or service on a second computing device.

12. The method of claim 1, wherein detecting the response to the contextual challenge having the content that is contextual to the aircraft comprises detecting a response to a challenge having a content that is contextual to at least one of: a flight of the aircraft, the user being on-board the aircraft, or the application or service being on-board the aircraft.

13. The method of claim 12, wherein:
detecting the response to the challenge having the content that is contextual to the flight of the aircraft comprises detecting a response to a request for at least one of a flight number, a departure airport, or an arrival airport of the aircraft;
detecting the response to the challenge having a content that is contextual to the user being on-board the aircraft comprises detecting a response to a request for at least one of a seat number assigned to the user or a flight record locator number assigned to the user; and
detecting the response to the challenge having the content that is contextual to the application or service being on-board the aircraft comprises detecting a response to a request for a name of an in-flight wireless network, wherein the name of the in-flight wireless network at least one of: changes for different flights, or is made available only while the aircraft is aloft.

14. The method of claim 4, wherein:
the user interface is a first user interface; and
the ad-hoc stimulus comprises at least one of a change in a spatial orientation of the mobile device or a user input at the first user interface or a second user interface of the mobile device.

15. The system of claim 7, wherein the contextual challenge having the content that is contextual to the aircraft comprises a request for information contextual to a flight of the aircraft.

16. The system of claim 15, wherein the information contextual to the flight of the aircraft includes at least one of: a flight number, a departure airport, or an arrival airport of the aircraft.

17. The system of claim 7, wherein the contextual challenge having the content that is contextual to the aircraft comprises a request for information contextual to the user being on-board the aircraft.

18. The system of claim 17, wherein the information contextual to the user being on-board the aircraft includes at least one of: a seat number assigned to the user or a flight record locator number assigned to the user.

19. The system of claim 7, wherein the contextual challenge having the content that is contextual to the aircraft comprises a request for information contextual to the application or service being on-board the aircraft.

20. The system of claim 19, wherein the information contextual to the application or service being on-board the aircraft includes a name of an in-flight wireless network, wherein the name of the in-flight wireless network at least one of: changes for different flights, or is made available only while the aircraft is aloft.

* * * * *